US012715196B2

(12) United States Patent
Xu

(10) Patent No.: US 12,715,196 B2
(45) Date of Patent: Aug. 25, 2026

(54) ENERGY-BASED MATERIAL DESIGN METHODS FOR DESIGNING PROTECTIVE PANELS AGAINST SPECIFIC-SIZED HAILS, PROTECTIVE PANELS AND PROTECTION SYSTEMS

(71) Applicant: NINGBO UNIVERSITY, Ningbo (CN)

(72) Inventor: Luoyu Roy Xu, Ningbo (CN)

(73) Assignee: NINGBO UNIVERSITY, Ningbo (CN)

( * ) Notice: Subject to any disclaimer, the term of this patent is extended or adjusted under 35 U.S.C. 154(b) by 296 days.

(21) Appl. No.: 18/351,497

(22) Filed: Jul. 13, 2023

(65) Prior Publication Data

US 2024/0025146 A1 Jan. 25, 2024

(51) Int. Cl.
*B32B 5/02* (2006.01)
*B32B 5/18* (2006.01)
(Continued)

(52) U.S. Cl.
CPC ................ *B32B 7/022* (2019.01); *B32B 5/02* (2013.01); *B32B 5/18* (2013.01); *B32B 5/245* (2013.01);
(Continued)

(58) Field of Classification Search
CPC ........... B32B 5/02; B32B 5/022; B32B 5/024; B32B 5/18; B32B 5/22; B32B 5/24;
(Continued)

(56) References Cited

U.S. PATENT DOCUMENTS 5,242,206 A 9/1993 Heck
5,401,074 A 3/1995 Timerman
(Continued)

FOREIGN PATENT DOCUMENTS

AU 2006100137 A4 5/2006
CN 102472048 A 5/2012
(Continued)

OTHER PUBLICATIONS

Progelhof, R.C. and Throne, J.L. (May 1979), Young's modulus of uniform density thermoplastic foam. Polym Eng Sci, 19: 493-499 (Year: 1979).*

(Continued)

*Primary Examiner* — Michael A Tolin

(74) *Attorney, Agent, or Firm* — Junhe Law Office P.C.; James J. Zhu

(57) ABSTRACT

Soft material design methods for developing protective panels against a hail with a diameter of more than 25 mm are provided, wherein the protective panel comprises a soft material layer. The methods comprise: selecting a material for the soft material layer, wherein the material has a Young's modulus $E_{sm}$ in a range of 1 MPa to 150 MPa, preferably 5 MPa to 100 MPa; and determining a minimum thickness $T_{sm}$ of the soft material layer based on the size of a hail and the material properties of the soft material and other materials inside the protective panel. A protection system that includes these protective panels covers a whole vehicle or some fragile parts on the ground.

12 Claims, 4 Drawing Sheets

(51) Int. Cl.
*B32B 5/24* (2006.01)
*B32B 7/022* (2019.01)
*B60J 11/04* (2006.01)

(52) U.S. Cl.
CPC ........... *B60J 11/04* (2013.01); *B32B 2307/54* (2013.01); *B32B 2307/72* (2013.01); *B32B 2307/7376* (2023.05); *B32B 2605/00* (2013.01)

(58) Field of Classification Search
CPC ....... B32B 5/245; B32B 7/022; B32B 27/065; B32B 27/12; B32B 27/32; B32B 27/40; B32B 2262/0253; B32B 2262/0269; B32B 2262/101; B32B 2262/106; B32B 2266/025; B32B 2266/0278; B32B 2307/51; B32B 2307/54; B32B 2307/558; B32B 2307/72; B32B 2307/7376; B32B 2605/00; B32B 2605/08; B60J 1/2094; B60J 11/00; B60J 11/04; B60J 11/06; B60J 11/08
See application file for complete search history.

(56) References Cited

U.S. PATENT DOCUMENTS

| | | | |
|---|---|---|---|
| 5,800,006 | A | 9/1998 | Pettigrew |
| 6,044,881 | A | 4/2000 | Welch et al. |
| 9,156,339 | B1 | 10/2015 | Perez et al. |
| 2005/0103120 | A1 | 5/2005 | Liu et al. |
| 2005/0264026 | A1 | 12/2005 | Badamo |
| 2013/0025647 | A1 | 1/2013 | Bouten et al. |
| 2018/0334020 | A1 | 11/2018 | Garnick |
| 2019/0241048 | A1 | 8/2019 | Xu |
| 2020/0130493 | A1 | 4/2020 | Bad Wound |

FOREIGN PATENT DOCUMENTS

| | | | |
|---|---|---|---|
| CN | 206826380 | U | 1/2018 |
| CN | 107839458 | A | 3/2018 |
| CN | 208428941 | U | 1/2019 |
| CN | 109789757 | A | 5/2019 |
| CN | 113297670 | A | 8/2021 |
| DE | 102015102984 | A1 | 9/2016 |
| EP | 1559602 | A2 | 8/2005 |
| EP | 2449188 | A1 | 5/2012 |
| WO | 1992015467 | A1 | 9/1992 |
| WO | 2005007436 | A1 | 1/2005 |

OTHER PUBLICATIONS

International Search Report of PCT/CN2022/106653, mailed on Dec. 29, 2022.

Uz Mehmet E., et al., Determining the empirical model for estimating the permanent deformation in flat roof panels under hail impact, Aip Advances, vol. 11, issue 12, pp. 1-15.

The Search Report for the counterpart CN patent application 202211252537.8, issued on May 14, 2025.

* cited by examiner

ENERGY-BASED MATERIAL DESIGN METHODS FOR DESIGNING PROTECTIVE PANELS AGAINST SPECIFIC-SIZED HAILS, PROTECTIVE PANELS AND PROTECTION SYSTEMS

TECHNICAL FIELD

The present invention relates to a protection system including one or more than one kind of protective materials and panels to protect the vehicles on the ground that are subjected to direct impact from large hails.

BACKGROUND OF THE INVENTION

Some countries such as Canada and the United States suffer large hailstorms every year. Severe hails can damage vehicles, especially their windshields and bodies. Here, vehicles include ground vehicles such as cars and flight vehicles such as airplanes. These large hails also damage other outdoor structures such as house roofs or solar panels. Due to climate change in recent years, hails have become more frequent than in previous years.

As an example, in the US, a new car windshield replacement costs around $500, and an aircraft's windshields are much more expensive. Even if the car owner has hail insurance, insurance deductions can be as high as one or two thousand dollars. The most painful thing for the vehicle owners is the repair waiting time. If hundreds of vehicles in a city are damaged and need to be repaired, car owners might not use their vehicle for more than a week. The biggest losers are those car dealers and rental companies who have many new cars. At the same time, insurance companies will suffer big losses after a severe hailstorm due to damage to the vehicles and house roofs.

Although there are more than 50 vehicle anti-hail patents in the world, only two to three products are sold on the current market. This shows that most patents are of no practical value and cannot help insurance companies or vehicle owners to save money and time. When hails come, some car owners have to use soft pillows, quilts, blankets, etc. to cover their cars. The existing products/patents simply continue the similar concept with these car owners.

For example, one product consists of three long strips of soft foam materials, covering the entire vehicle. Another inflatable protection product fills an airbag to cover the entire car before hails arrive. However, these two protection systems have significant disadvantages: both systems are very troublesome to install, at least 10 to 20 minutes, but hails usually arrive in three minutes. So, a new product/invention should be installed within three minutes.

The most fatal weakness of these products is that they are not designed based on science. For example, the long foam-strip product is able to withstand 70% hailstones, without any scientific justification or testing results. According to statistics from the US Insurance Institute of Business and Home Safety (IBHS), the maximum diameter of 70% of hailstones is less than 20 mm.

IBHS also states that only when the diameter of a hailstone exceeds 25 mm, it will cause damage to the vehicles and require repair. Moreover, the thickness of their foam strip is only six mm. According to the calculation of the present invention, these foams can only withstand hails with a diameter of no more than 10 mm.

The inflatable bag system claims to be able to withstand all hails. But the largest hailstone diameter observed in the US was 200 mm (weight 0.9 kg). There is no scientific evidence to prove that this product can withstand all hails.

The same problems exist in most previous patents. Almost all patents follow the same design pattern: an external cover system which covers (1) the entire car (CN107839458 A; U.S. Pat. Nos. 6,044,881; 5,800,006; WO1992015467A1), (2) partial car body which faces direct hail impact including the front and back windshields, hood etc. (U.S. Pat. No. 5,242,206A; EP1559602A2).

In terms of hail damage reduction mechanisms, previous patents mainly employ (1) soft/flexible materials (CN208428941U; U.S. Pat. No. 9,156,339B1; WO1992015467A1), and (2) inflatable cushions (U.S. Pat. Nos. 5,242,206A; 9,156,339B1; EP1559602A2). In order to protect vehicles against large hails, the soft material layers or inflatable cushions should be thick enough to absorb hail's kinetic energy. However, no quantitative relations between the thickness/volume of the soft material/inflatable cushion and the hail size were disclosed in all previous patents. Without these quantitative relations, a person who has ordinary skills cannot build any effective products against large hails following the information of these patents.

For example, EP1559602A2 describes an inflatable device but the device thickness was not disclosed. If the thickness of this device is two mm, it cannot protect vehicles against dangerous hails with diameters of more than 25 mm. WO1992015467A1 described a hail blanket that included at least one energy absorbing flexible mat, but its thickness relation with the hail size was not disclosed. U.S. Pat. No. 9,156,339B1 described a hail cover that did not include any thickness requirement against hail impact. U.S. Pat. No. 5,800,006 disclosed an impact protective car cover that did not specify its thickness. U.S. Pat. No. 5,242,206A disclosed an automotive hail blanket without any thickness information. Almost all similar patents on hail protection do not have the critical thickness information (U.S. Pat. No. 5,401,074).

Only a few patents addressed the thickness issue for hail protection. US 2005/0264026A1 described a thick vehicle cover (six inches) of vinyl. The inventor stated that "Thicker car covers for better car protection." However, the patent did not provide a quantitative relation between the thickness of vinyl and the maximum hail size, i.e., a six-inch vinyl was enough against a hail with a diameter of six inches or not.

WO2005007436A1 described a hybrid protective structure with a softer layer on the surface of a car and at least one harder layer above the softer layer. However, there were no quantitative definitions of the hard or soft layers/materials. The Young's modulus of hail is around 10 GPa, so it can be treated as soft material compared to the Young's moduli of steel (200 GPa) and glass (70 GPa) parts of the vehicle. So WO2005007436A1 failed to define the soft material respect to the hailstone or car part.

On the other hand, hails are very hard compared to soft polymer foams. The above patent cited harder layers made of polypropylene (PP) and high-density polyethylene (HDPE) plates (Young's moduli 1-5 GPa), and then fiber/fabrics-reinforced polymer composites (Young's modulus at least 60 GPa, much harder than PP or HDPE plates) as examples. These inconsistent information/examples demonstrate that accurate engineering designs should be employed for hail protection, for example, citing the critical material properties such as Young's moduli rather than enumerating different materials in this invention.

WO2005007436A1 did mention that the harder layer can have a material thickness of 0.1 mm to 5 mm, but it did not explain the purpose of using a wide variation (5 mm/0.1 mm=50 times). Moreover, this patent did not answer the critical questions for product designs—is a thin or thick harder layer better for hail protection? Is 5 mm layer effective to reduce damage of a hail with a diameter of 25 mm? Indeed, the above patent did not employ any scientific knowledge to design hail protection products.

WO2005007436A1 defined a softer layer as a foamed plastic which was open or closed cell. This definition was vague and ambiguous because the densities and Young's moduli of these foams vary more than 1,000 times. So scientific justification must be introduced to define a feasible range for these protective materials and the corresponding hail-protection levels (i.e., stopping hail damage for a specific hail diameter). It is almost impossible to conduct natural hail impact tests to examine the effectiveness of a hail protection product, because the hail size distribution is highly random, and the expected large hail might not hit the protective product.

DE102015102984A1 disclosed a detailed design of a hail protection mat that comprised a foam layer of a polyurethane material (PU foam) with a thickness of at least 5 mm (preferably no more than 9.5 mm) which was effective against hailstones up to 20 mm in diameter. But no scientific justification of these data was disclosed. This patent was still vague because there are several kinds of PU foams within the defined density range. Therefore, a thickness of 5 mm to 9.5 mm was not enough to make a product based on this patent because an accurate thickness was needed.

DE102015102984A1 disclosed a wide range of PU foam properties, which were directly cited from the open literature. It also specified only one foam for protection which significantly limited its application, because future new materials should have better properties and/or lower costs. Therefore, this was a typical disadvantage of previous patents to only use the existing materials. To overcome this disadvantage, the current invention mainly proposes some critical material properties to select materials rather than proposing some specific existing materials.

Lack of scientific justification to define hail protection existed not only in previous vehicle protection patents, but also in other hail protection patents. For example, EP2449188A1 described a hail-resistant roofing method, and several layers of different materials were proposed. A flexible layer (soft foam) was used for the dissipation of hail impact energy, and the flexible foam layer was selected from one of the closed/open cell foam materials.

The method described in EP2449188A1 was too vague because there are more than 50 kinds of open/closed cell foams with very different properties and costs. This patent mentioned a polymeric layer/ply roofing membrane having a thickness of 0.762 mm to 2.54 mm. However, there was no justification (protection against a specific hailstone) of such a wide thickness range.

Meanwhile, the hail protection conception of previous patents was not clear. Hail damage of the metal part of a vehicle is caused by plastic deformation, so a dent is seen and should be repaired. However, if the depth of a small dent is 0.1 mm, it is not visible according to the current repair standards. On the other hand, hail damage of the window glass is typically brittle fracture, so holes or cracks form and these windows should be replaced.

In terms of mechanics, these two damage modes are totally different. As a result, the repair and replacement procedures and costs of the two damage modes are very different. However, previous patents did not state the difference of these two damage modes and only used a general term—hail protection. One basic question is that if one protective material system does not lead to any crack on the windshield, will the same system lead to no plastic deformation (dents) on the hood and other metal parts under the same hail impact? The answer needs in-depth scientific knowledge, which was not found from the prior art.

SUMMARY OF THE INVENTION

Accordingly, the present invention is directed to protect both metal and glass parts of a vehicle that substantially obviate one or more of the previous protection problems due to limitations and disadvantages of the related art. Systematic engineering methods for large hail protection using different material designs are developed. Quantitative relations between the hail protection level (in terms of the hail size) and the detailed material volume/thickness are derived.

According to an aspect of the present application, several material design methods for designing protective panels against a hail with a radius equal or smaller than a predetermined value R are provided, wherein the protective panels comprise a soft material layer. The material design methods comprise selecting a material for the soft material layer, wherein the material has a Young's modulus $E_{sm}$ in a range of 1 MPa to 150 MPa, preferably 5 MPa to 100 MPa; and determining the minimum thickness $T_{sm}$ of the soft material layer based on the predetermined value R, the material properties of the soft material layer, and other materials in the same protective panels.

According to another aspect of the present application, a protective panel against a hail with a radius equal or smaller than a predetermined value R is provided. The protective panel comprises a package and a soft material layer disposed inside the package, wherein the soft material has a Young's modulus $E_{sm}$ in a range of 1 MPa to 150 MPa, preferably 5 MPa to 100 MPa.

According to yet another aspect of the present application, a protection system against a hail having a radius equal or smaller than a predetermined value R is provided. The protection system comprises at least one protective panel, wherein at least one protective panel is shaped and sized to cover a component, for example the fragile part, or the whole vehicle, to be protected from hails.

Additional features and advantages of the invention will be set forth in the descriptions that follow and in part will be apparent from the description or may be learned by practice of the invention. The objectives and other advantages of the invention will be realized and attained by the structure particularly pointed out in the written description and claims thereof as well as the appended drawings.

For each material design method, if a hail protective level is given, the required layer thicknesses can be determined by the derived linear and nonlinear equations based on impact mechanics principles. The mechanics principles which are employed to design hail protection systems are beyond the undergraduate engineering course Mechanics of Materials, because these principles are related to the Theory of Elasticity, Theory of Plasticity, Theory of Plates and Shells, Contact/Indentation Mechanics, Impact Dynamics, and Mechanics of Composite Materials. Therefore, the outcome of this invention is not obvious to an engineer with an undergraduate training only.

It is to be understood that both the foregoing general description and the following detailed description are exemplary and explanatory and are intended to provide further explanations of the invention as claimed.

BRIEF DESCRIPTION OF DRAWINGS

The drawings referenced herein form a part of the specification. Features shown in the drawing illustrate only some embodiments of the application, and not of all embodiments of the application, unless the detailed description explicitly indicates otherwise, and readers of the specification should not make implications to the contrary.

DETAILED DESCRIPTION OF THE INVENTION

The following detailed description of exemplary embodiments of the application refers to the accompanying drawings that form a part of the description. The drawings illustrate specific exemplary embodiments in which the application may be practiced. The detailed description, including the drawings, describes these embodiments in sufficient details to enable those skilled in the art to practice the application. Those skilled in the art may further utilize other embodiments of the application, and make logical, mechanical, and other changes without departing from the spirit or scope of the application. Readers of the following detailed description should, therefore, not interpret the description in a limiting sense, and only the appended claims define the scope of the embodiment of the application.

As used herein, spatially relative terms, such as "above", "on", "in", "inside", "top", "bottom", "side" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
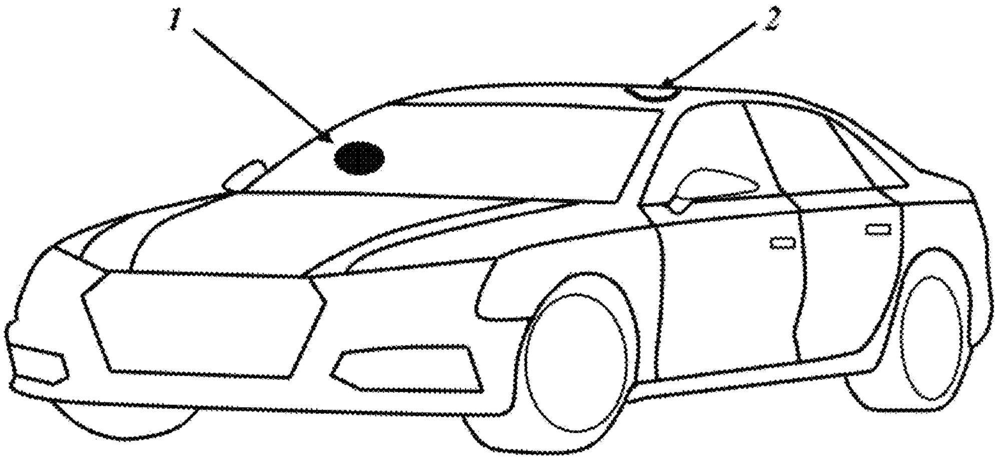
FIG. 1 schematically illustrates a vehicle on the ground without any protection.

FIG. 1 shows a dent 2 and a hole 1 caused by a large hail impact of a vehicle. The protection definition is no visible dents or cracks, which do not require any repair or replacement.

Figure 2:
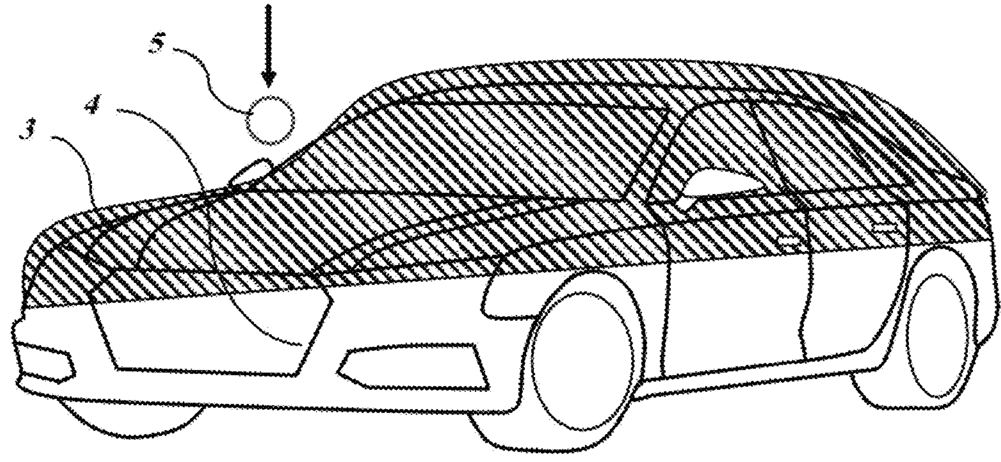
FIG. 2 illustrates a vehicle on the ground with a hail protection system according to an embodiment of the present application attached thereon.

FIG. 2 shows an external protection system 3 mounted on a vehicle 4 subjected to impact from a hail 5. The mount method is not a subject due to its obvious nature. Because of the large protective area, a protection system 3 often consists of several smaller protective panels. The protective panels are shaped and sized to cover the corresponding components (e.g., front and back windshields, hood, roof and trunk) of the vehicle. The protection system 3 further comprises a mount assembly for detachably mounting the protective panels onto the components to be protected. Alternatively, the protective panels may also be used to protect other subjects which are placed outdoors, such as glass roofs, solar panels and etc.

The protective panel has at least one soft material layer, which has two functions: (1) absorbing the kinetic energy of a large hail, and (2) reducing the impact force acting on the vehicles. In this invention, the Young's modulus of a material is the only parameter to define a soft or hard material.

The Young's modulus of a hail is 9.39 GPa (which is often considered as a hard material), so the material of the soft material layer of the present invention should have its Young's modulus of 0.15 GPa or less. The Young's modulus of a material is a material constant for its deformation capability which can be measured using a specific material test standard. For example, the Young's modulus can be measured using ASTM E 1876-01 (2009) Standard Test Method for Dynamic Young's Modulus by Impulse Excitation Technique. It is well understood in the art that specific test standards in different countries are slightly different, but their objectives are the same. There are numerous materials to be selected as the material for producing the soft material layer, and a major purpose of this invention is to select the suitable materials for the soft material layer based on proposed mechanical properties and determine the minimum thickness of the soft material layer for a specific hail size.

The current invention does not simply enumerate current materials, because some current materials will become obsolete, and future materials often have great advantages. Hence, simplified equations and principles based on mechanics theory are proposed here for hail protection designs that can be applied to both current and future materials.

The general idea of the invention is to employ dynamic indentation mechanics theory to model a hail impact problem. Previous research found that the windshield has less impact resistance than the metal part such as the hood of a car. The crack initiation and propagation on the windshield is related to the local stress distribution, which is a complicated 3-D stress tensor problem. The merit of this invention is to employ the energy balance method for simplifying the protection material design, which becomes a 1-D scalar problem. Its cost is that the protection system is conservative.

1. Using Indentation Mechanics to Analyze Hail Impact

Figure 3:
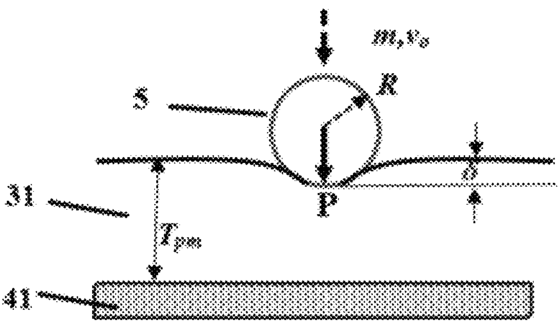
FIG. 3 schematically illustrates a hail impact event on a vehicle with a protection system having a soft material layer according to one embodiment of the present application.
Figure 4:
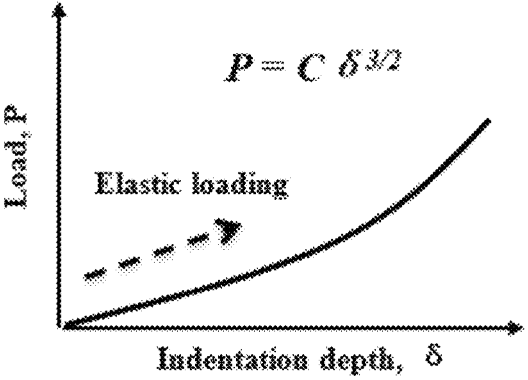
FIG. 4 schematically illustrates a typical indentation force and depth curve expressed by Hertz's contact law.

Large hails 5 hit a vehicle or outdoor structure such as the roof of a car or house and lead to impact damage and fracture. This phenomenon can be explained using indentation mechanics because a hail is model as a spherical object. As shown in FIG. 3, the indentation force P of a spherical indenter (hail 5) is a function of the elastic indentation depth δ and the hail radius R based on Hertz contact law (See KL Johnson, Contact Mechanics, Cambridge University Press, London, 1985, p. 90):

$$P = \frac{4}{3}\sqrt{R}E_r\delta^{\frac{3}{2}} = C\delta^{\frac{3}{2}}, \quad (1)$$

where C is the contact stiffness, and the above relation is shown in FIG. 4. The reduced modulus Er is determined by the Young's modulus E and Poisson's ratio v of the hail 5 and the protective material, and the subscripts "hail" and "pm" refer to the hail 5 and protective material:

$$\frac{1}{E_r} = \frac{1 - v_{hail}^2}{E_{hail}} + \frac{1 - v_{pm}^2}{E_{pm}}. \quad (2)$$

According to the series rule-of-mixture for the composite stiffness in mechanics of composite materials (see IM Daniel, O Ishai, Engineering Mechanics of Composite Materials. Oxford University Press, New York, 2005, p. 73), the Young's modulus of the protective material/panel including a soft material layer 31 is almost equal to the Young's modulus of the soft material 31 $E_{sm}$ ($\approx E_{pm}$), if the Young's moduli of other materials of the protective panels are much larger than that of the soft material layer 31. Therefore, the major task of the protective material design is to determine the thickness of the soft material layer $T_{sm}$.

The maximum tensile stress along the radius direction is responsible for the break of windshield glass or other fragile part 41:

$$\sigma_{rr}^{max} = \left(\frac{1-2v}{2\pi}\right)\left(\frac{4E_r}{3}\right)^{2/3} P^{1/3} R^{-2/3} \quad (3)$$

Therefore, the maximum stress is an increasing function of the impact force P. On the formation of a dent caused by a hail impact, the kinetic energy W required to produce a visible dent of a metal plate is $$W = K_{s2}\sigma_{yd}^{0.915} t^{0.322} \quad (4)$$

where $\sigma_{yd}$ is the yield strength of the metal, t is the thickness of the metal plate, and KS2 is a constant found to be 0.005 for the units MPa and mm (M. F. Shi et al., An Evaluation of the Dynamic Dent Resistance of Automotive Steels, Society of Automotive Engineers, Detroit, MI, USA, SAE No. 970158, 1991). Following Abrate (S. Abrate, Impact on Composite Structures. Cambridge University Press, New York, 1998), the maximum impact force of a hail is determined by its kinetic energy W, and the contact stiffness C between the hail and the protective panel:

$$P_{max} = \lambda\sqrt[5]{W^3C^2} \approx 2\sqrt[5]{W^3RE_r^2} \quad (5)$$

where λ is a constant that is independent of the boundary and support conditions (λ≈1.73 for a spherical projectile like a hail 5).

It is expected that two energy levels to cause dents and cracks are different according to equations (4) and (5). So if one protective panel can stop metal damage (dent), it might not prevent windshield 41 fracture. Therefore, we must employ a conservative design, i.e., the protective panel must absorb all kinetic energy W from a hail, i.e., zero kinetic energy transfers to the metal part or the windshield 41. Therefore, the protective panel would prevent any impact damage of the protected targets.

To achieve the above objectives, referring to FIGS. 2 to 3 and 6 to 7, the present invention provides an external protection system 3 against large hails 5 using material designs. The protection system 3 has at least one soft material layer 31 which is placed above the vehicle surface to reduce the contact force and absorb the kinetic energy of the hail. The protective panel has at least five material design methods: (1) linear-elastic materials as soft material layer, (2) nonlinear-elastic materials as soft material layer, (3) additional high-energy absorption fabric sheet 33 that wrap the soft material layer 31 for providing extra energy absorption. The linear-elastic material, and nonlinear-elastic material have different mechanical properties, so man can distinguish those materials by their respective mechanical properties that will be further discussed below.

2. Linear-Elastic Materials as Soft Material Layer

If the soft material layer 31 is a linear-elastic material, based on the energy balance for protection, the elastic strain energy $W_{SE}$ inside the soft material caused by impact force (indentation force) is equal to the kinetic energy W of a hail $$5(= 0.5\ mv_o^2),$$

and it can be expressed by $$W_{SE} = \int_0^{\delta_{max}} P d\delta = \frac{2}{5}C\delta_{max}^{5/2} = W \quad (6)$$

where $\delta_{max}$ is the maximum indentation depth. During a hail impact process, the maximum impact force $P_{max}$, is achieved at the maximum indentation depth $\delta_{max}$.

The reduction of impact force P can be demonstrated by an example. The Young's modulus and Poisson's ratio are 9.39 GPa and 0.33 for a hail 5, and 66 GPa and 0.22 for window glass. If a hail 5 hits a windshield 41, the reduced modulus $E_r$ is around 9.15 GPa using equation (2). If a soft material layer 31 that has its Young's modulus of 0.1 GPa is placed in front of the windshield 41, $E_r$ is around 0.1 GPa. The maximum impact force applied on the windshield 41 protected by the soft material layer 31 is around 27% of the maximum impact force applied on the windshield 41 without any protection (i.e., 73% impact force reduction). As used herein, the term "soft material" in the invention refers to a material having a Young's modulus which is no more than 1.5% of the Young's modulus of a hail or 150 MPa.

Furthermore, according to equation (2), the Young's modulus of the protective panel is much smaller than that of the hail 5, and the square of the Poisson's ratio of the protective panel is close to zero, so we can make an approximation: $E_{sm} \approx E_r$.

The thickness of the soft material layer $T_{sm}$ should exceed the maximum indentation depth according to equation (6):

$$T_{sm} \geq \delta_{max} = \left(\frac{15\ W}{8\sqrt{R}E_{sm}}\right)^{2/5} \quad (7)$$

Therefore, if the protective level in terms of the hail radius R (then its kinetic energy W) is known, the minimum thickness of the soft material layer 31 can be calculated using equation (7) by a person with ordinary skills. Equation (7) also implies that the average compressive strain of the soft material layer $\varepsilon_{sm}=\delta_{sm}/T_{sm}<1.0$.

The protective panel design is not a pure impact mechanics problem, because it is related to the cost, weight, machining, even shipping issues. It is expected that the protective panel should be thick enough to protect vehicles against large hails. As a result, its weight increases. Although soft materials with high Young's moduli are preferred to reduce the total material volume, the moduli of some materials such as foams and honeycombs are an increasing function of their densities (related to the total weight). Hence, it is preferred that the density of the soft material layer 31 is less than 200 kg/m$^3$, preferable 150 kg/m$^3$.

Moreover, thick panels lead to high shipping costs, and this factor should be considered during the early product design stage because covering a vehicle requires a very large production area and volume.

If the thickness of the protective panel for a sedan's windshield is 0.75" (19 mm), its weight is less than 10 lbs. but its volume is very large. Major US shipping companies such as UPS and FedEx employ so-called "volume weight" (usually larger than the actual weight) to calculate the shipping cost, which is mainly determined by the total volume of the product. The typical shipping cost of a potential hail protection product would be $50 for shipping inside Texas.

US 2005/0264026A1 describes a thick vehicle cover of six inches (152 mm), so its potential product would have a huge shipping cost. It is suggested that the thickness of the protective panel should be less than 30 mm, or as small as possible.

From the viewpoint of impact energy absorption, the thicker panel is better. But from the viewpoints of the total cost and weight, the thinner panel is better. Therefore, embodiments of this invention provide several design methods and define some parameter ranges to seek balanced results for future feasible products.

If a material of the soft material layer is selected and its Young's modulus is known, its required minimum thickness of protection against a large hail 5 can be calculated by equation (7). Table 1 lists some material design data against different sizes of hails 5, which can be used by a person without advanced mechanics background.

As an example, if a hail protection system 3 is designed to stop damage caused by a large hail 5 with a diameter of 2.25 inches (57.1 mm), and a soft material layer 31 with a Young's modulus of 10 MPa is chosen ($E_r \approx E_{sm}$), its minimum thickness for protection is 20.5 mm.

The minimum protection thicknesses against very large hails 5 with their diameters of more than 64 mm are not listed in Table 1, but they can be calculated using equation (7). However, the large hail protection system 3 requires very thick soft material layers 31 and significantly increase the costs of soft materials and shipping. The Young's modulus of the soft material layer 31 should be around 1 Mpa to 150 Mpa.

For the Young's moduli listed in Table 1, if the Young's modulus E of one soft material layer is 1 Mpa, its required soft material layer thickness easily exceeds 30 mm, which is not recommended due to the high shipping cost (the preferred thickness is no more than 20 mm). So the preferred Young's modulus range of candidate materials is 5 Mpa to 100 Mpa.

TABLE 1

Minimum thickness (mm) of the soft material layer 31 related to the hail diameters and material moduli (MPa)

| Hail diameter | Young's modulus | | | | |
|---|---|---|---|---|---|
| (inch/mm) | 100 | 50 | 20 | 10 | 1 |
| 1.25/31.8 | 3.6 | 4.7 | 6.8 | 9.0 | 22.6 |
| 1.5/38.1 | 4.6 | 6.1 | 8.8 | 11.6 | 29.2 |
| 1.75/44.4 | 5.7 | 7.6 | 10.9 | 14.4 | 36.3 |
| 2.0/50.8 | 6.9 | 9.1 | 13.2 | 17.4 | 43.7 |
| 2.25/57.1 | 8.2 | 10.8 | 15.6 | 20.5 | 51.6 |
| 2.5/63.5 | 9.5 | 12.5 | 18.0 | 23.8 | 59.7 |

Research shows that the maximum impact force predicted by indentation theory is often overestimated, and the reasons are complicated. For example, a hail 5 may rebound, so its kinetic energy cannot be 100% absorbed by the protective panel. Also, a hail 5 might be crushed if the impact force is large, so the peak pressure/stresses acting on the protective panel becomes relatively small compared to the values based on Hertz's model.

Moreover, only these hails 5 with diameters over 25-30 mm (kinetic energy up to 5J) lead to damage to the vehicles without protection. Therefore, using equations (1)-(7) for anti-hail designs is very conservative because the proposed energy balance method is to absorb 100% kinetic energy of large hails. However, even if there is residual kinetic energy, as long as it is less than 5J, no damage would be expected on the windshields 41 with a protective panel. As a result, a safety factor is not recommended for these preferred thickness data in Table 1.

In reality, engineering materials are rarely linear-elastic materials. Glass has linear-elastic deformation before fracture, but it is a very hard material. Spring systems can be viewed as linear-elastic materials for protection too, but they are hard to use. However, there are many soft materials that show nonlinear-elastic deformation with plateau deformation, and these protective materials are better than pure linear-elastic materials, because they can significantly reduce the impact force and stress.

3. Nonlinear-Elastic Materials with Plateau Deformation as Soft Material Layer

Figure 5:
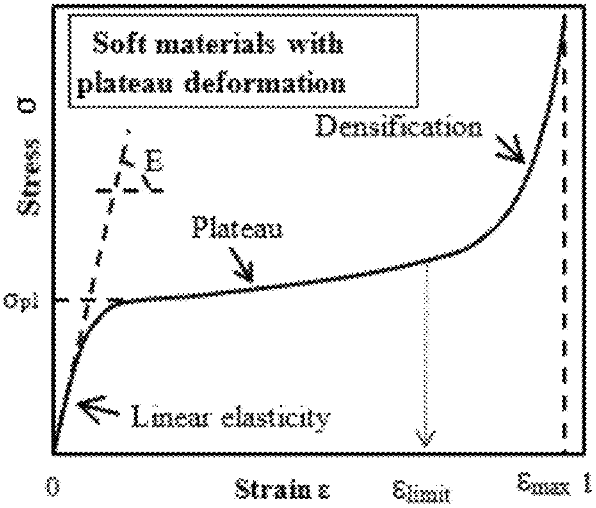
FIG. 5 schematically illustrates typical compressive stress-strain curve of a foam under unidirectional compression which expresses the deformation characteristic of a nonlinear-elastic material.

Particularly, foams are typical nonlinear-elastic soft materials. During hail impact, protective materials are subjected to high compressive stresses. The stress-strain responses of soft foams in compression tests show very similar deformation characteristics for different types of foams. FIG. 5 shows a typical compressive stress-strain curve of a nonlinear-elastic material. A region of linear elasticity at a low stress level is followed by a long collapse plateau in which the stress does not vary a lot, truncated by a region of densification in which the stress rises steeply. If the stress is reduced to zero, no permanent deformation is found, i.e., no plastic deformation or damage inside the foam material. As shown in FIG. 5, the initial slope of the linear stress-strain relation is the Young's modulus E. The plateau strength $\sigma_{pl}$ is the stress when the nonlinear deformation starts, and it is a material property. This is a critical material property in addition to the Young's modulus. The Young's modulus and plateau strength can be measured using ASTM D3574-17 Standard Test Methods for Flexible Cellular Materials-Slab, Bonded, and Molded Urethane Foams (ASTM or American Society for Testing and Materials is an international standards organization). In other countries, the test standards might be different, but their goals are the same.

The Young's modulus E can be measured accurately. However, $\sigma_{pl}$ is not very accurate as shown in FIG. 5. Therefore, the plateau strain $\varepsilon_{pl}$ ($\approx\sigma_{pl}/E$), and the plateau displacement $\delta_{pl}$ ($\approx\varepsilon_{pl}*T_{sm}$) are convenient to use. The strain energy of the soft material during the linear-elastic deformation stage is:

$$W_{le} = \int_0^{\delta_{pl}} P_1 d\delta = \frac{2}{5} C\delta_{pl}^{5/2} = \frac{2}{5} C\varepsilon_{pl}^{5/2} T_{sm}^{5/2} \tag{8}$$

The average contact pressure Pm at the plateau deformation stage is defined by $$P_m = \frac{P_2}{\pi a^2} = \sigma_{pl}.(a^2 = R\delta), \text{ so } P_2 = \pi R\sigma_{pl}\delta \tag{9}$$

If the compressive deformation cause by hail 5 impact reaches the densification stage, the stress inside foams will significantly increase and may damage the window glass behind the soft material layer 31. Therefore, a compressive strain limit $\varepsilon_{limit}$ (preferred value 0.5~0.6), and an indentation depth limit ($\delta_{limit}=\varepsilon_{limit}T_{sm}$) should be employed. The energy absorption of the soft material layer 31 during the plateau deformation stage is:

$$W_{le} = \int_{\delta_{pl}}^{\delta_{limit}} P_2 d\delta = \frac{1}{2}\pi R \sigma_{pl}\left(\delta_{limit}^2 - \delta_{pl}^2\right) = \frac{1}{2}\pi R \sigma_{pl}\left(\varepsilon_{limt}^2 - \varepsilon_{pl}^2\right) T_{sm}^2 \tag{10}$$

Based on the total energy balance principle, $$W_{le} + W_{pl} = \frac{8}{15}\sqrt{R} E_{sm} \varepsilon_{pl}^{5/2} T_{sm}^{5/2} + \frac{1}{2}\pi R \sigma_{pl}\left(\varepsilon_{limit}^2 - \varepsilon_{pl}^2\right) T_{sm}^2 = W \tag{11}$$

By numerically solving nonlinear equation (11) (online tools are available), the thickness of the soft material layer 31 $T_{sm}$ can be obtained. Many foams can be employed as soft material layer 31 such as PE and PU foams.

4. Soft Materials Wrapped by High-Energy Absorption Fabric Sheet

Figure 6:
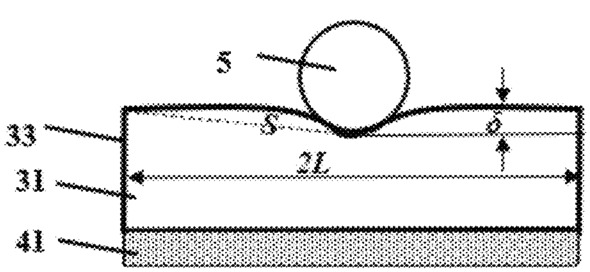
FIG. 6 schematically illustrates a hail impact on a vehicle part with a protection system having a soft material layer wrapped with fabric sheets according to one embodiment of the present application.

Energy absorption/dissipation of foams and honeycombs is limited and requires large material volumes. This embodiment of the present invention introduces a new protective material design to absorb the hail kinetic energy more effectively, while the system still keeps its light and soft features. As illustrated in FIG. 6, the soft material layer 31 is wrapped by fabric sheet 33 with high-energy absorption capability such as the ballistic fabrics. These high-energy absorption materials are soft and light, and they can absorb a very large amount of kinetic energy (e.g., 400 J of a handgun bullet) of all kinds of projectiles. The major shortcoming of such fabrics is their high costs. However, even a small number of very thin fabric sheets 33 are employed, the thickness of the soft material layer 31 could be reduced to save shipping costs. Therefore, the final protective panel would be thin, soft and light.

If the original length of the soft material layer 31 (also the fabric sheet 33) is 2 L, the final length of the fabric sheet 33 will increase under the maximum indentation depth. It is expected that the fabric sheet 33 and the soft material layer 31 will deform together under the compressive hail impact force. If S is the half final length of the fabric sheet 33 (a curve according to a side view), the normal strain of the fabric sheet 33 can be defined by $$\varepsilon = \frac{S - L}{L} \tag{12}$$

In order to derive some equations for estimation, a straight line is assumed to replace the curve as the final length S of the fabric sheet 33. According to the geometry of a rectangular triangle which is related to the indentation depth $\delta$, $$S^2 = L^2 + \delta^2 \text{ then, } \varepsilon = \frac{S - L}{L} = \sqrt{1 + (\delta/L)^2} - 1 \tag{13}$$

The elastic strain energy of the fabric sheet 33 can be expressed by $$W_{fs} = \frac{1}{2} E_{fb}\varepsilon^2 (2L * A_{fb}) \tag{14}$$

where $E_{fb}$ and $A_{fb}$ are the Young's modulus and the cross-sectional area of the fabric sheet 33, and $\varepsilon^2$ can be approximated using Taylor series expansion:

$$\varepsilon^2 = 2 + (\delta/L)^2 - 2\sqrt{1 + (\delta/L)^2} \approx 0.25(\delta/L)^4 \tag{15}$$

Therefore, equation (14) can be approximated as $$W_{fs} \approx \frac{E_{fb} A_{fb} \delta_{max}^4}{4L^3} \tag{16}$$

If these fabric sheets 33 are employed to wrap 1) linear-elastic materials, 2) nonlinear-elastic material layers, the extra energy absorption expressed by equation (16) is added into equations (6) and (11), and two new nonlinear equations based on the energy balance principle are employed to estimate the required thicknesses of the soft material layer 31:

$$\frac{E_{fb} A_{fb} T_{sm}^4}{4L^3} + \frac{8}{15}\sqrt{R} E_{sm} T_{sm}^{5/2} = W \tag{17}$$

$$\frac{E_{fb} A_{fb} \varepsilon_{limit}^4}{4L^3} T_{sm}^4 + \frac{8}{15}\sqrt{R} E_{sm} \varepsilon_{pl}^{5/2} T_{sm}^{5/2} + \frac{1}{2}\pi R\sigma_{pl}\left(\varepsilon_{limit}^2 - \varepsilon_{pl}^2\right) T_{sm}^2 = W \tag{18}$$

For a new design case, one fabric sheet 33 and its thickness are determined first, then one of the above nonlinear equations can be solved numerically to obtain the minimum thicknesses of the specific soft material layer 31 chosen.

Any fabric with a very large tensile strength (preferably more than 500 MPa) and a fracture strain (preferably more than 5%) can be used to wrap the soft material layer 31.

These fabric sheets often have a layer thickness of 0.1 to 0.2 mm, and at least one or more layers should be employed. Preferred fabric sheets include aramid, carbon, glass fabrics, especially ballistic fabrics Ultra-High-Molecular-Weight Polyethylene (UHMWPE) and S2-glass fabrics (low cost compared to UHMWPE).

Although rubbers and other elastomers are soft materials with low Young's moduli, their densities (also weights and costs) are too high compared to foams or honeycombs, so they are not good candidate materials because they are heavy and costly.

EXAMPLES

Figure 7:
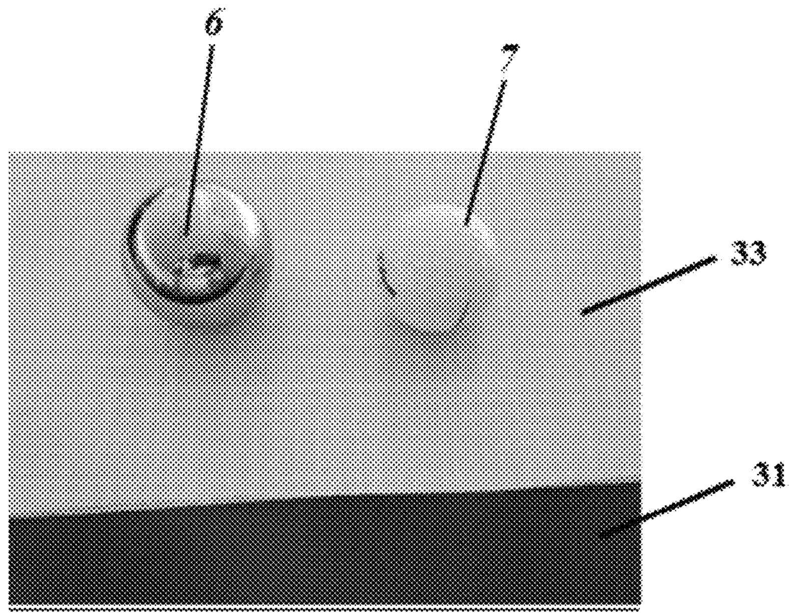
FIG. 7 shows a protection system having a soft high-density polyethylene foam (HDPE) layer wrapped with a Dyneema ballistic fabrics according to an embodiment of the present application.

FIG. 7 shows a soft material layer HDPE (thickness of 19.0 mm, nonlinear elastic material) wrapped with high-energy absorption UHMWPE fabrics 33 (white ballistic fabrics Dyneema, thickness of 0.2 mm). This combined protection system is employed to protect windshields against the impact of a golf-ball-sized hail. A real golf ball 7 (white, diameter of 44.45 mm) is placed above the material system, along with a shining steel ball 6 (diameter of 50.8 mm) to conduct equivalent hail impact tests.

EXPERIMENTAL VALIDATION: There is no test standard to evaluate the hail-resistance of a protection system on a vehicle worldwide. The hail-resistance test of a protection system on a house roof is available in the US, and a steel ball is dropped from a certain height to simulate the hail impact on the roof.

In our impact tests, the weight of the steel ball shown in FIG. 7 is 0.53 kg. In order to simulate the golf-ball-sized hail with the kinetic energy of 20 joules, the steel ball was dropped from 4.0 meters above the protection system, which was placed above windshield glass. Ten identical impact tests were conducted for each protection system shown in FIG. 7, and no crack was found on windshield glass.

Although the above tests were based on the similarity rule on impact energy, they also obeyed the similarity rule on impact force. According to the series rule-of-mixture in mechanics of composite materials, the Young's modulus of the combined protective material system shown in FIG. 6 is almost equal to the Young's modulus of the soft material (foam) $E_{sm}$. Therefore, the reduced moduli of the real hail/protective material system impact and the steel ball impact/protective material system impact are almost equal to $E_{sm}$ according to equation (2).

According to equation (1), the contact stiffness of the steel ball impact is 6.9% higher than that of the hail impact. As a result, steel ball impact tests lead to slightly higher impact force and more conservative or safer results.

DE102015102984A1 describes the comparable hail impact tests of one PU foam (thickness of 6 mm) and one PE foam (thickness of 10 mm). When the diameter of the hail 5 was 30 mm and its speed was 25 m/s, the PU foam had small impression points (not a good result because its damage affects the full protection capability). While the PE foam had cracks and the target had distinct deformation, i.e., a complete failure case of protection.

However, the two kinds of foams did not have a fair comparison. Although their major material properties were close, or at least the same level, the density of the PU foam (240 kg/m$^3$) was about eight times the density of the PE foam. It means that the weights/costs and Young's moduli of these two foams were very different. Therefore, the density of the soft material in this invention should be less than 200 kg/m$^3$, preferably less than 150 kg/m$^3$.

The above impact tests exactly support the results of embodiments of the present invention. Although the name of the above PE foam was not disclosed by DE102015102984A1, based on its low density of 30 kg/m$^3$, its Young's modulus was around 0.5 to 1.0 MPa (see MF Ashby, Materials Selection in Mechanical Design, 4$^{th}$ Edition, Elsevier, Burlington, USA, 2011, pp. 503-505). According to Table 1, the required thickness for protection against a hail of 30 mm is at least 22.6 mm. So, it is not surprising that the PE foam with a thickness of 10 mm failed in their impact test.

About the specific PU foam in the same impact test, no Young's modulus was found from the manufacturer and open literature, so our modeling method was not able to predict. Anyway, the invention of DE102015102984A1 was effective for limited hail protection (diameter of no more than 30 mm). But its narrow thickness range of 5 mm to 9.5 mm hindered its applications against large hails. On the other hand, embodiments of the present invention provide several general material design methods for protection against much larger hails (diameter>30 mm).

COMPUTER SIMULATION OF ONE DESIGN/EXAMPLE: A large panel of a HDPE foam (nonlinear elastic material) with a thickness of 15 mm was placed above the back windshield of a sedan. The sizes of the windshield (also the HDPE panel) were 1050 mm×1050 mm and its thickness was 4 mm. The diameter of the hail was 44 mm (kinetic energy of 20J) and the impact site was at the center of the windshield. The Young's modulus and the plateau strength of one specific HDPE foam were 7 MPa and 0.5 MPa. LS-DYNA software, which is specialized for impact/dynamics simulation was employed to simulate the above impact problem. The maximum tensile stress (principal stress) at the bottom surface of the windshield was always below the tensile strength of glass (50-70 MPa). Therefore, this HDPE foam and its thickness are effective to protect the back windshield against impact from a hail with a diameter of 44 mm.

The invention claimed is:

1. A method of making a protective panel against hail with a radius equal to or smaller than a predetermined value R, wherein the protective panel comprises a soft material layer, the method comprising:

selecting a material for the soft material layer, wherein the material of the soft material layer has a Young's modulus $E_{sm}$ in a range of 1 MPa to 150 MPa, and the material has a linear elastic deformation characteristic or a nonlinear elastic deformation characteristic; and producing a protective panel having the soft material layer with a minimum thickness $T_{sm}$ calculated based on the predetermined value R, mechanical properties of the soft material layer and other materials in the same protective panel, wherein the step of producing the protective panel having the soft material layer with the minimum thickness $T_{sm}$ comprises;

calculating $T_{sm}$ using Equation 1:

$$T_{sm} = \left(\frac{15\ W}{8 \cdot \sqrt{R} E_{sm}}\right)^{2/5}$$

when the material of the soft material layer has the linear elastic deformation characteristic, wherein W is kinetic energy of a pellet of hail having a radius of the predetermined value R, and $E_{sm}$ is the Young's modulus of the soft material layer; or calculating $T_{sm}$ using Equation 2:

$$W = \frac{8}{15}\sqrt{R}E_{sm}\varepsilon_{pl}^{5/2}T_{sm}^{5/2} + \frac{1}{2}\pi R\sigma_{pl}(\varepsilon_{limit}^2 - \varepsilon_{pl}^2)T_{sm}^2$$

when the material of the soft material layer has the nonlinear elastic deformation characteristic, wherein W is kinetic energy of a pellet of hail having a radius of the predetermined value R, $E_{sm}$ is the Young's modulus of the soft material layer, $\sigma_{pl}$ is a plateau strength of the soft material layer, $\varepsilon_{pl}$ is a plateau strain of the soft material layer, $\varepsilon_{limit}$ is a compressive strain limit of the soft material layer, and $\varepsilon_{limit}$ has a value of 0.5 to 0.6.

2. The method of claim 1, wherein the soft material layer has a density of no more than 200 kg/m$^3$.

3. The method of claim 1, wherein when calculating $T_{sm}$ using Equation 1, for protection against hail with a diameter of 31.8 mm, the minimum thickness of the soft material layer with a Young's modulus of 100 MPa is 3.6 mm, the minimum thickness of the soft material layer with a Young's modulus of 50 MPa is 4.7 mm, the minimum thickness of the soft material layer with a Young's modulus of 20 MPa is 6.8 mm, the minimum thickness of the soft material layer with a Young's modulus of 10 MPa is 9.0 mm, and the minimum thickness of the soft material layer with a Young's modulus of 1 MPa is 22.6 mm.

4. The method of claim 1, wherein when calculating $T_{sm}$ using Equation 1, for protection against hail with a diameter of 38.1 mm, the minimum thickness of the soft material layer with a Young's modulus of 100 MPa is 4.6 mm, the minimum thickness of the soft material layer with a Young's modulus of 50 MPa is 6.1 mm, the minimum thickness of the soft material layer with a Young's modulus of 20 MPa is 8.8 mm, the minimum thickness of the soft material layer with a Young's modulus of 10 MPa is 11.6 mm, and the minimum thickness of the soft material layer with a Young's modulus of 1 MPa is 29.2 mm.

5. The method of claim 1, wherein when calculating $T_{sm}$ using Equation 1, for protection against hail with a diameter of 44.4 mm, the minimum thickness of the soft material layer with a Young's modulus of 100 MPa is 5.7 mm, the minimum thickness of the soft material layer with a Young's modulus of 50 MPa is 7.6 mm, the minimum thickness of the soft material layer with a Young's modulus of 20 MPa is 10.9 mm, the minimum thickness of the soft material layer with a Young's modulus of 10 MPa is 14.4 mm, and the minimum thickness of the soft material layer with a Young's modulus of 1 MPa is 36.3 mm.

6. The method of claim 1, wherein when calculating $T_{sm}$ using Equation 1, for protection against hail with a diameter of 50.8 mm, the minimum thickness of the soft material layer with a Young's modulus of 100 MPa is 6.9 mm, the minimum thickness of the soft material layer with a Young's modulus of 50 MPa is 9.1 mm, the minimum thickness of the soft material layer with a Young's modulus of 20 MPa is 13.2 mm, the minimum thickness of the soft material layer with a Young's modulus of 10 MPa is 17.4 mm, and the minimum thickness of the soft material layer with a Young's modulus of 1 MPa is 43.7 mm.

7. The method of claim 1, wherein when calculating $T_{sm}$ using Equation 1, for protection against hail with a diameter of 57.1 mm, the minimum thickness of the soft material layer with a Young's modulus of 100 MPa is 8.2 mm, the minimum thickness of the soft material layer with a Young's modulus of 50 MPa is 10.8 mm, the minimum thickness of the soft material layer with a Young's modulus of 20 MPa is 15.6 mm, the minimum thickness of the soft material layer with a Young's modulus of 10 MPa is 20.5 mm, and the minimum thickness of the soft material layer with a Young's modulus of 1 MPa is 51.6 mm.

8. The method of claim 1, wherein when calculating $T_{sm}$ using Equation 1, for protection against hail with a diameter of 63.5 mm, the minimum thickness of the soft material layer with a Young's modulus of 100 MPa is 9.5 mm, the minimum thickness of the soft material layer with a Young's modulus of 50 MPa is 12.5 mm, the minimum thickness of the soft material layer with a Young's modulus of 20 MPa is 18.0 mm, the minimum thickness of the soft material layer with a Young's modulus of 10 MPa is 23.8 mm, and the minimum thickness of the soft material layer with a Young's modulus of 1 MPa is 59.7 mm.

9. A method of making a protective panel against hail with a radius equal to or smaller than a predetermined value R, wherein the protective panel comprises a soft material layer, the method comprising:

selecting a material for the soft material layer, wherein the material of the soft material layer has a Young's modulus $E_{sm}$ in a range of 1 MPa to 150 MPa, and the material has a linear elastic deformation characteristic;

producing a protective panel having the soft material layer with a minimum thickness $T_{sm}$ calculated based on the predetermined value R, mechanical properties of the soft material layer and other materials in the same protective panel; and wrapping a fabric sheet around the soft material layer, wherein the fabric sheet has a tensile strength of more than 500 MPa and a fracture strain of more than 5%, wherein the step of producing the protective panel having the soft material layer with the minimum thickness $T_{sm}$ comprises:

calculating $T_{sm}$ using Equation 3:

$$W = \frac{E_{fb}A_{fb}T_{sm}^4}{4L^3} + \frac{8}{15}\sqrt{R}E_{sm}T_{sm}^{5/2}$$

wherein W is kinetic energy of a pellet of hail having a radius of the predetermined value R, $E_{fb}$ is a Young's modulus of the fabric sheet, $A_{fb}$ is a cross-sectional area of the fabric sheet, $E_{sm}$ is the Young's modulus of the soft material layer, and 2L is a length of the soft material layer.

10. The method of claim 9, wherein the fabric sheet is made of fibers selected from a group consisting of Ultra-High-Molecular-Weight Polyethylene (UHMWPE) and S2-glass.

11. A method of making a protective panel against hail with a radius equal to or smaller than a predetermined value R, wherein the protective panel comprises a soft material layer, the method comprising:

selecting a material for the soft material layer, wherein the material of the soft material layer has a Young's modulus $E_{sm}$ in a range of 1 MPa to 150 MPa, and the material has a nonlinear elastic deformation characteristic;

producing a protective panel having the soft material layer with a minimum thickness $T_{sm}$ calculated based on the predetermined value R, mechanical properties of the soft material layer and other materials in the same protective panel; and wrapping a fabric sheet around the soft material layer, wherein the fabric sheet has a tensile strength of more than 500 MPa and a fracture strain of more than 5%, wherein the step of producing the protective panel having the soft material layer with the minimum thickness $T_{sm}$ comprises:

calculating $T_{sm}$ using Equation 4:

$$W = \frac{E_{fb} A_{fb} \varepsilon_{limit}^4}{4L^3} T_{sm}^4 + \frac{8}{15}\sqrt{R}\, E_{sm} \varepsilon_{pl}^{5/2} T_{sm}^{5/2} + \frac{1}{2}\pi R \sigma_{pl}\left(\varepsilon_{limit}^2 - \varepsilon_{pl}^2\right) T_{sm}^2$$

wherein W is kinetic energy of a pellet of hail having a radius of the predetermined value R, $E_{fb}$ is a Young's modulus of the fabric sheet, $A_{fb}$ is a cross-sectional area of the fabric sheet, $E_{sm}$ is the Young's modulus of the soft material layer, 2L is a length of the soft material layer, $\sigma_{pl}$ is the plateau strength of the soft material layer, $\varepsilon_{pl}$ is the plateau strain of the soft material layer, $\varepsilon_{limit}$ is the compressive strain limit of the soft material layer, and $\varepsilon_{limit}$ has a value of 0.5 to 0.6.

12. The method of claim 11, wherein the fabric sheet is made of fibers selected from a group consisting of Ultra-High-Molecular-Weight Polyethylene (UHMWPE) and S2-glass.

* * * * *